United States Patent
Ford et al.

(10) Patent No.: US 9,415,565 B2
(45) Date of Patent: *Aug. 16, 2016

(54) UNDERLAYMENT WITH OF NON-WOVEN POLYETHYLENE MESH

(71) Applicants: Richard Ford, Braselton, GA (US); Richard Allgood, Lawrenceville, GA (US)

(72) Inventors: Richard Ford, Braselton, GA (US); Richard Allgood, Lawrenceville, GA (US)

(73) Assignee: Pak-Lite, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,847

(22) Filed: Sep. 28, 2015

(65) Prior Publication Data

US 2016/0016377 A1 Jan. 21, 2016

Related U.S. Application Data

(63) Continuation-in-part of application No. 14/819,610, filed on Aug. 6, 2015, now Pat. No. 9,169,659, which is a continuation-in-part of application No. 14/728,513, filed on Jun. 2, 2015, now Pat. No. 9,109,108, which is a continuation-in-part of application No. 13/965,885, filed on Aug. 13, 2013, now abandoned.

(51) Int. Cl.
| | |
|---|---|
| *E04C 1/00* | (2006.01) |
| *E04C 2/20* | (2006.01) |
| *E04F 15/02* | (2006.01) |
| *C08L 31/04* | (2006.01) |

(Continued)

(52) U.S. Cl.
CPC ............. *B32B 5/028* (2013.01); *B32B 27/08* (2013.01); *B32B 27/12* (2013.01); *B32B 27/36* (2013.01); *C08L 31/04* (2013.01); *E04F 15/0215* (2013.01); *E04F 15/02038* (2013.01); *E04F 15/105* (2013.01); *E04F 15/186* (2013.01); *E04F 15/203* (2013.01); *B32B 2255/10* (2013.01); *B32B 2255/205* (2013.01); *B32B 2264/0214* (2013.01); *B32B 2307/718* (2013.01); *B32B 2419/04* (2013.01); *E04F 2201/0146* (2013.01)

(58) Field of Classification Search
CPC .............. E04F 15/18; E04B 5/00; E04B 5/43; E04C 2/02; E04C 2/20; E04C 2/205; E04C 2/24

See application file for complete search history.

(56) References Cited

U.S. PATENT DOCUMENTS 4,252,910 A * 2/1981 Schaefer ................... B68G 1/00 36/117.1
5,032,442 A * 7/1991 Yamazaki .............. B29D 28/00 264/146

(Continued)

*Primary Examiner* — Joshua J Michener
*Assistant Examiner* — Keith Minter
(74) *Attorney, Agent, or Firm* — Bryan W. Bockhop; Bockhop Intellectual Property Law, LLC

(57) ABSTRACT

A hybrid underlayment, includes a thermoplastic making up between 92.0% by volume to 95.5% by volume of the hybrid underlayment. A plurality of expanded microspheres is dispersed through the thermoplastic. The microspheres are expanded to a volume in a range of between 180 square micrometers and 1450 square micrometers. The microspheres makeup between 1.0% by volume to 7.5% by volume of the hybrid underlayment. The hybrid underlayment is extruded into a flat sheet having a thickness of between 1.0 mm and 2.0 mm and a density from 7 pcf to 25 pcf. A metalized thermoplastic film is laminated to the top surface of the thermoplastic sheet. A pre-stretched laminated oriented mesh fabric is fused to the metalized thermoplastic film.

19 Claims, 3 Drawing Sheets

(51) Int. Cl.
   *E04F 15/20*   (2006.01)
   *C08L 23/06*   (2006.01)
   *B32B 5/02*    (2006.01)
   *B32B 27/08*   (2006.01)
   *B32B 27/12*   (2006.01)
   *B32B 27/36*   (2006.01)
   *E04F 15/18*   (2006.01)
   *E04F 15/10*   (2006.01)

(56) References Cited

U.S. PATENT DOCUMENTS

| | | | | |
|---|---|---|---|---|
| 5,422,380 A * | 6/1995 | Mendelsohn | C08J 9/0061 | 521/107 |
| 6,033,509 A * | 3/2000 | Miyamoto | B32B 3/10 | 156/164 |
| 6,106,924 A * | 8/2000 | Yamazaki | B29C 55/023 | 428/105 |
| 6,582,795 B1 * | 6/2003 | Seppanen | B32B 27/32 | 156/177 |
| 6,808,776 B2 * | 10/2004 | Mientus | B32B 27/06 | 428/200 |
| 8,209,927 B2 * | 7/2012 | Cottier | C04B 28/02 | 52/125.5 |
| 8,450,225 B2 * | 5/2013 | Restuccia | B29C 70/083 | 442/172 |
| 8,512,848 B2 * | 8/2013 | Reichwein | B32B 3/10 | 428/156 |
| 8,833,028 B2 * | 9/2014 | Whispell | E04F 15/02 | 52/588.1 |
| 2003/0157295 A1 * | 8/2003 | Burns, Jr. | D06N 7/0086 | 428/95 |
| 2006/0070326 A1 * | 4/2006 | Collison | B32B 5/08 | 52/403.1 |
| 2006/0216471 A1 * | 9/2006 | Grah | B32B 3/266 | 428/137 |
| 2007/0202303 A1 * | 8/2007 | Bischoff | B32B 5/26 | 428/195.1 |
| 2008/0035021 A1 * | 2/2008 | Sambasivan | C04B 28/26 | 106/286.5 |
| 2008/0070019 A1 * | 3/2008 | Good | B32B 17/04 | 428/218 |
| 2009/0191780 A1 * | 7/2009 | Schiffer | C08J 5/18 | 442/394 |
| 2009/0308001 A1 * | 12/2009 | Wu | E04B 1/762 | 52/173.3 |
| 2010/0021718 A1 * | 1/2010 | Vos | B32B 5/26 | 428/315.9 |
| 2010/0151220 A1 * | 6/2010 | Bowmar | B29C 44/12 | 428/220 |
| 2012/0291387 A1 * | 11/2012 | Keane | E04F 15/02038 | 52/403.1 |
| 2013/0145707 A1 * | 6/2013 | Pervan | B32B 21/02 | 52/309.1 |
| 2013/0212968 A1 * | 8/2013 | Demmig | C09J 5/06 | 52/309.1 |
| 2014/0147688 A1 * | 5/2014 | Corral | B29C 70/443 | 428/519 |
| 2015/0174791 A1 * | 6/2015 | Dauphin | B32B 5/10 | 428/215 |

* cited by examiner

UNDERLAYMENT WITH OF NON-WOVEN POLYETHYLENE MESH

CROSS-REFERENCE TO RELATED APPLICATION(S)

This application is a continuation-in-part of, and claims the benefit of, U.S. patent application Ser. No. 14/819,610, filed on Jun. 2, 2015, which is a continuation-in-part of, U.S. patent application Ser. No. 14/728,513, filed on Jun. 2, 2015, patented as U.S. Pat. No. 9,109,108, which is a continuation-in-part of U.S. patent application Ser. No. 13/965,885, filed Aug. 18, 2018, now abandoned, the entirety of each of which is hereby incorporated herein by reference.

FIELD OF THE INVENTION

The present invention relates to flooring systems and, more specifically, to a flooring system for interlocking flooring units.

DESCRIPTION OF THE RELATED ART

Luxury vinyl tile (LVT) flooring units are increasingly used in high end flooring applications. Such flooring units, while made of vinyl, often have a texture and color corresponding to other flooring materials, such as ceramic tiles and wood. They are frequently (but not always) less expensive than the floorings materials they resemble. They also tend to be lighter and easier to install that other flooring materials and often are more resistant to scuffs and stains.

LVT units typically have complementary locking surfaces on their edges so that adjacent units are locked to each other along their edges. Most installers of LVT units place an underlayment between the subfloor and the flooring units. This underlayment improves the acoustics and feel of the flooring units by absorbing movement between the flooring units and the floor substrate as users walk across the surface of the flooring units.

Typical underpayments tend to be resilient, which allows for dampening of the effects of people walking on the floor. However, because the underlayments do not provide adequate support for the locking surfaces of the flooring units, the locking surfaces along the edge of a flooring unit tend to be weaker than the rest of the flooring unit. Therefore, when one's heel, or other pressure source, is applied to the locking joint between two flooring units, the locking surfaces become weakened due to the resilience of the underlayment. Through enough use, the locking surfaces can become degraded and even break.

Therefore, there is a need for a flooring system with an underlayment that reduces stress on the locking surfaces of LVT flooring units while providing adequate sound dampening.

SUMMARY OF THE INVENTION

The disadvantages of the prior art are overcome by the present invention which, in one aspect, is a flooring for covering a floor substrate that includes a hybrid underlayment and a plurality of interfacing LVT flooring units. The hybrid underlayment is disposed on the floor substrate. The hybrid underlayment includes an extruded thermoplastic sheet having a plurality of gas-filled expanded thermoplastic microspheres distributed throughout the thermoplastic sheet. Each of the plurality of interfacing LVT flooring units is disposed on the hybrid underlayment.

In another aspect, the invention is a floor, which includes a substrate. A hybrid underlayment is coupled to the floor substrate with a first adhesive layer. The hybrid underlayment includes an extruded sheet that includes thermoplastic and a plurality of gas-filled expanded thermoplastic microspheres having a pre-expansion particle size within a range of 28 µm to 38 µm and distributed throughout the thermoplastic. A plurality of LVT units, each of which is coupled to the hybrid underlayment by a second adhesive layer.

In another aspect, the invention is a method of installing a floor on a floor substrate, in which a first adhesive layer is applied to the floor substrate. A hybrid underlayment is placed on the first adhesive layer. The hybrid underlayment includes an extruded thermoplastic sheet having a plurality of gas-filled expanded thermoplastic microspheres distributed therein. A second adhesive layer is applied to the hybrid underlayment. A plurality of interfacing LVT flooring units is placed on the second adhesive layer.

In another aspect, the invention is a hybrid underlayment that includes a thermoplastic sheet making up between 92.0% by volume to 95.5% by volume of the hybrid underlayment. The thermoplastic sheet has a top surface and an opposite bottom surface. A plurality of expanded microspheres is dispersed through the thermoplastic sheet. The microspheres are expanded to a volume in a range of between 180 square micrometers and 1450 square micrometers. The microspheres make up between 1.0% by volume to 7.5% by volume of the hybrid underlayment prior to expansion of the microspheres. A metalized thermoplastic film is laminated to the top surface of the thermoplastic sheet.

In yet another aspect, the invention is a hybrid underlayment that includes a metalized thermoplastic film having a top side and an opposite bottom side. A pre-stretched laminated oriented mesh fabric is fused to at least a portion of the bottom side of the metalized thermoplastic film. A thermoplastic sheet has a top surface and an opposite bottom surface. The metalized thermoplastic film and the pre-stretched laminated oriented mesh fabric is disposed on and coupled to the top surface of the thermoplastic sheet. A plurality of expanded microspheres is dispersed through the thermoplastic sheet.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
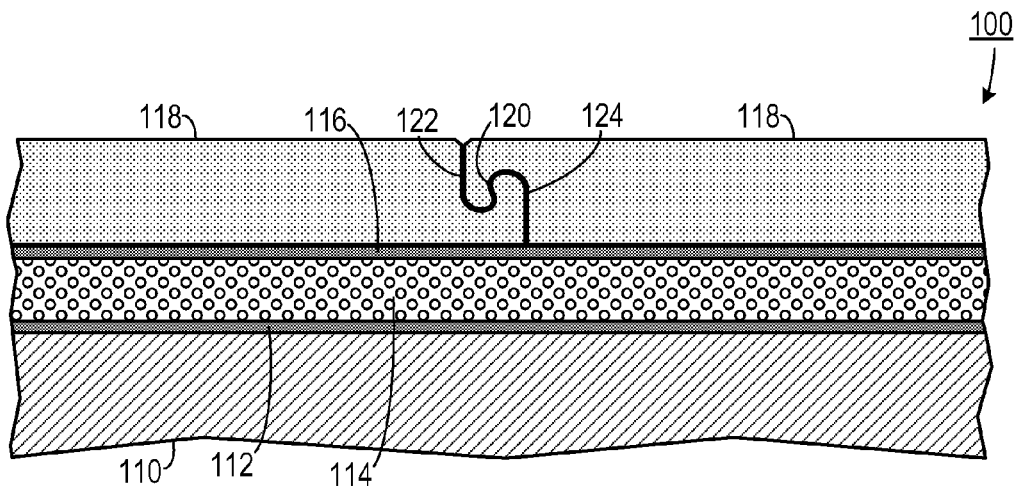
FIG. 1 is a schematic drawing of one embodiment of a flooring system that employs an adhesive.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Also, as used herein, luxury vinyl tile (LVT) units mean flooring units that both meet the ASTM F1700 standard for Solid Vinyl Floor Tile and include printing (including three dimensional printing) thereon that causes the LVT units to resemble ceramic tile, stone, terrazzo or wood.

U.S. Pat. No. 6,106,924, issued to Yamazaki, U.S. Pat. No. 5,032,442 issued to Yamazaki et al., and U.S. Pat. No. 6,033,509 issued to Miyamoto et al. disclose pre-stretched laminated oriented mesh fabrics and methods of making pre-stretched laminated oriented mesh fabrics. These patents are hereby incorporated herein by reference for the purpose of disclosing non-woven pre-stretched laminated oriented mesh fabrics and methods of making pre-stretched laminated oriented mesh fabrics.

As shown in FIG. 1, one embodiment of a flooring system 100 includes a sub-floor substrate 110, which can be a plywood subfloor. A first adhesive layer 112 is disposed on the substrate 110 and a hybrid underlayment 114 is disposed on the first adhesive layer 112 so that the hybrid underlayment 114 is coupled to the substrate 110. A second adhesive layer 116 is disposed on the hybrid underlayment 114 and a plurality of interlocking LVT units 118 is secured to the hybrid underlayment 114 with the second adhesive layer 116. Typically, the flooring units 118 interface each other along a joint 120, which could be as simple as a butt-joint. In one embodiment, the flooring units 118 have complimentary-shaped locking edges 122 and 124 that allow for the interlocking of adjacent flooring units at a joint 120.

The hybrid underlayment 114 includes a thermoplastic sheet in which a plurality of gas-filled expanded thermoplastic microspheres distributed throughout the thermoplastic sheet. In one embodiment, the thermoplastic is polyethylene (which could be either HDPE or LDPE and a plasticizer such as ethylene vinyl acetate (EVA), depending on the specific application). In other embodiments, the thermoplastic can include such plastics as: polypropylene, acrylonitrile butadiene styrene, ethylene-vinyl acetate, polystyrene, poly vinyl chloride, thermoplastic polyolefin, polyethylene terephthalate, polyvinyl fluoride and combinations thereof.

In one embodiment, the microspheres have a pre-expansion particle size within a range of 28 μm to 38 μm and expand when heated to a temperature of about 200° C. In one method of making the underlayment, microsphere pellets are combined with thermoplastic and the combination is heated to about 200° C., during which time the microspheres expand and the combination is then extruded in sheet form to the desired thickness through an extruder.

In one embodiment, Matrix 318 thermoplastic copolymer formulation, available from Matrix Polymers Inc. of Cold Spring Harbor, N.Y., which is a proprietary combination of LDPE and EVA, is used and Expancel® 930-MB-120 microspheres available from Expancel Inc., AkzoNobel of Duluth, Ga. are used. The amount of thermoplastic used is in a range of between 92.0% by volume to 95.5% by volume and the amount of pre-expanded microspheres used is in a range of 1.0% by volume to 7.5% by volume, with any remaining amount being a pigment used to impart color on the resulting sheet material. The combination of thermoplastic and microspheres is heated to a temperature of at least 200° C. so that the microspheres expand to an average size of about 600-700 square micrometers in a range of between 180 square micrometers and 1450 square micrometers. The material is extruded through an extruder so as to have a width in a range of 1.0 mm to 2.0 mm with density in a range of 7 pcf (pounds per cubic foot) to 25 pcf.

In one specific embodiment, the extruded sheet has a thickness of 1.0 mm and a density of 25 pcf. This embodiment uses 93.5% thermoplastic, 3.5% microspheres (prior to expansion of the microspheres) and 3.0% pigment. In another specific embodiment, the extruded sheet has a thickness of 1.5 mm and a density of 19 pcf. This embodiment uses 92.0% thermoplastic, 5.0% microspheres (prior to expansion of the microspheres) and 3.0% pigment.

It has been found that the hybrid underlayment 114 provides good support to the joints 120 between adjacent LVT flooring units 118, thereby reducing stress at the locking surfaces 122 and 124, while also providing good sound dampening. This can result in less wear on the locking surfaces 122 and 124 and an extended lifespan for the LVT flooring units 118. The sound dampening characteristic of the underlayment 114 reduces annoying "clicking" sounds heard by inhabitants of the floor underneath the floor on which the underlayment 114 is used.

Figure 2:
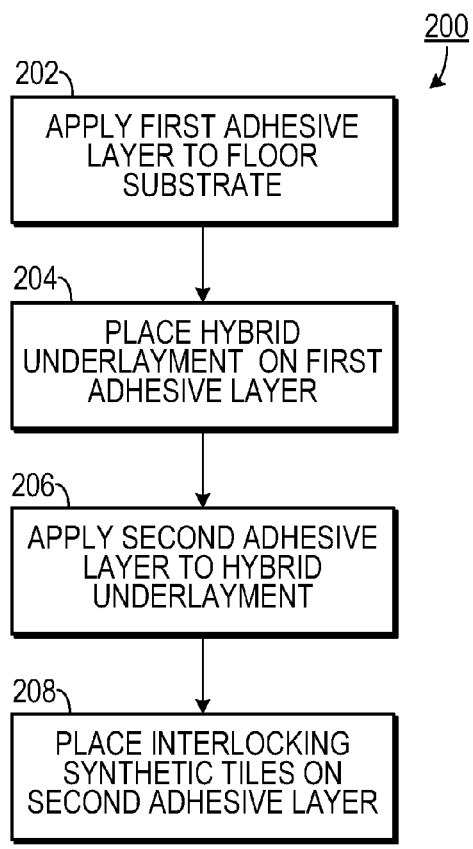
FIG. 2 is a flow chart showing one embodiment of a method of installing a floor.

As shown in FIG. 2, in one method 200 of installing a floor on a floor substrate, a first adhesive layer is applied to the floor substrate 202. A hybrid underlayment is placed on the first adhesive layer 204. The hybrid underlayment includes an extruded thermoplastic sheet having a plurality of gas-filled expanded thermoplastic microspheres distributed therein. A second adhesive layer is applied to the hybrid underlayment 206. A plurality of interlocking synthetic LVT flooring units is placed on the second adhesive layer 208.

Figure 3:
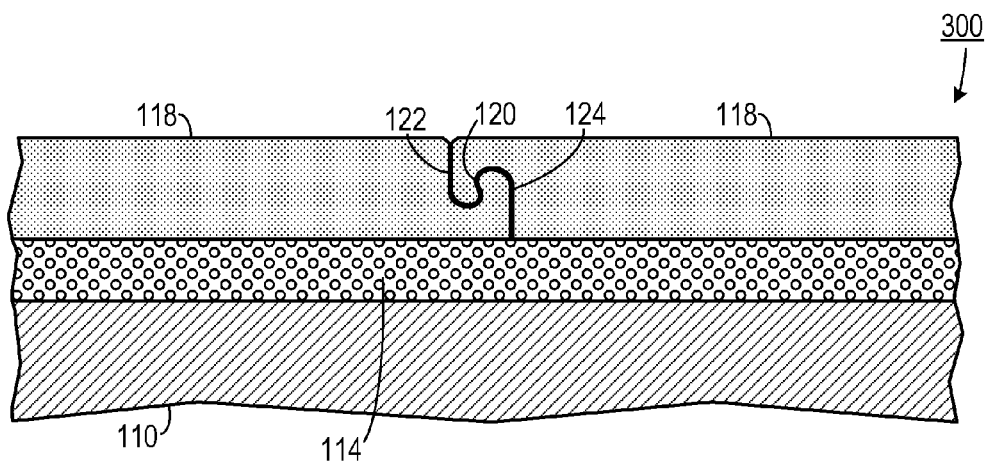
FIG. 3 is a schematic drawing of one embodiment of a flooring system that does not employ adhesive.

As shown in FIG. 3, in one embodiment of a flooring system 300, the hybrid underlayment 114 is placed directly on the substrate 110 and the LVT flooring units 118 are placed directly on the hybrid underlayment 114, without being secured by adhesive.

Figure 4:
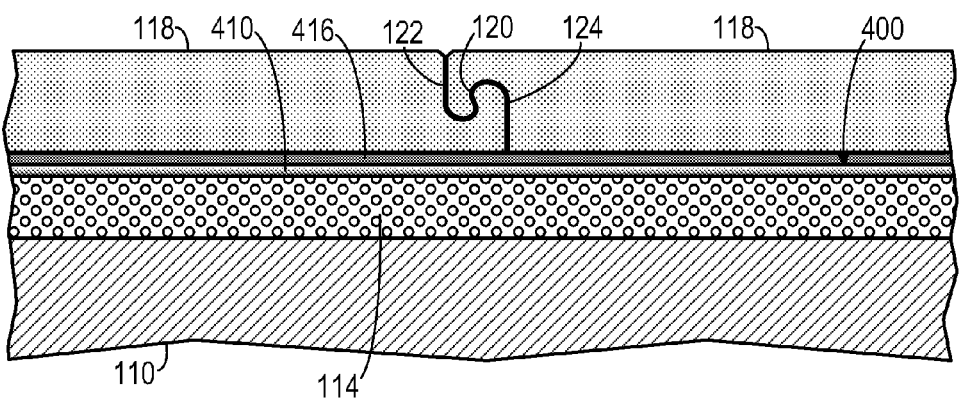
FIG. 4 is a schematic drawing of one embodiment of a flooring system that includes a metalized thermoplastic film.

As shown in FIG. 4, in one embodiment a metalized thermoplastic film 410, such as metalized polyethylene terephthalate (PET), is laminated onto a top surface of the thermoplastic sheet 114, typically during extrusion with a heat-activated glue 416. The metalized thermoplastic film enhances the vapor barrier characteristics of the underlayment 400 providing extra moisture protection. It also enhances stabilization of the underlayment 400 when glued under the LVT flooring units 118. Typically, the metalized polyethylene terephthalate film will have a thickness in a range of 15 microns to 200 microns. In one embodiment, it has a thickness of 50 microns.

Figure 5A:
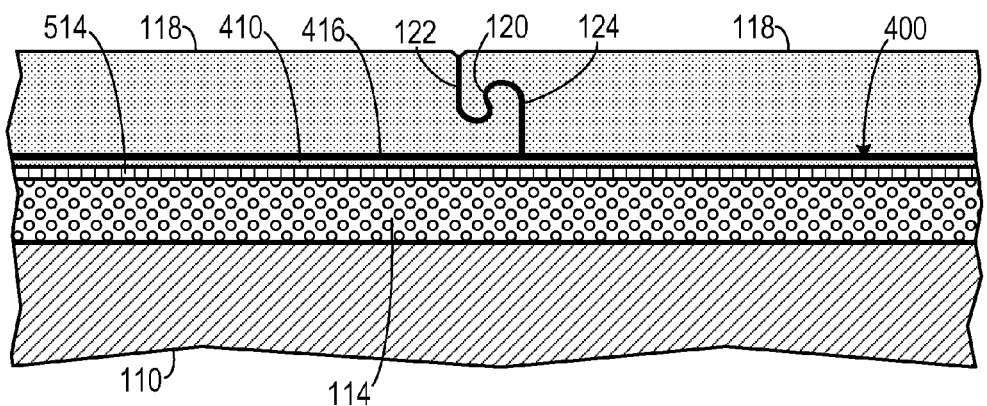
FIG. 5A is a schematic drawing of one embodiment of a flooring system that includes a pre-stretched laminated oriented mesh fabric.
Figure 5B:
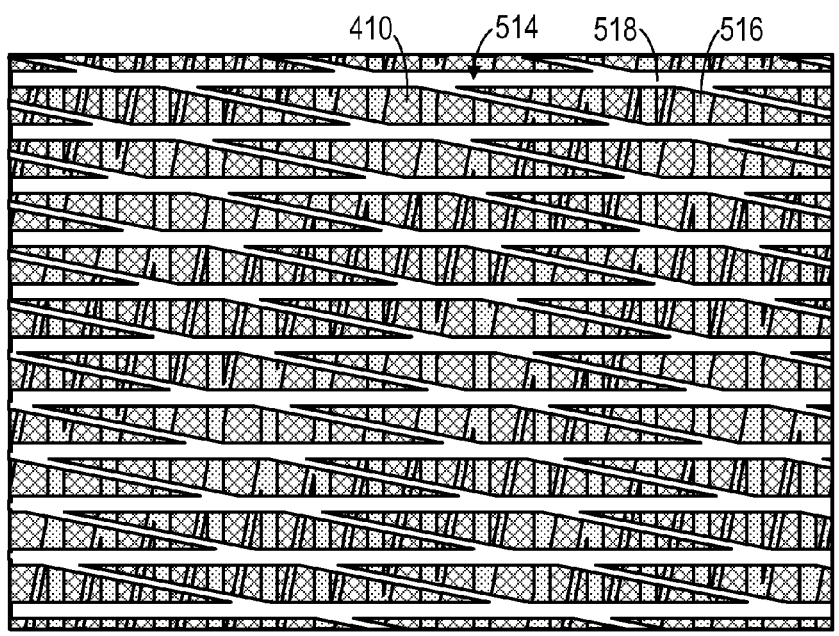
FIG. 5B is a schematic drawing of one embodiment of a pre-stretched laminated oriented mesh fabric that is coupled to a metalized thermoplastic film.

In one embodiment, as shown in FIGS. 5A and 5B, a non-woven pre-stretched laminated oriented mesh fabric 514 is fused to the bottom side of the metallized thermoplastic film 410. In one representative embodiment, the pre-stretched laminated oriented mesh fabric 514 includes a first layer 516 of pre-stretched plastic sheet that is laminated to a second layer 518 of pre-stretched plastic sheet, wherein the second layer 518 has an orientation that is different from the orientation of the first layer 516. In one embodiment, the pre-stretched laminated oriented mesh fabric 514 comprises a thermoplastic resin, which can include polyethylene, which is laminated to the metallized thermoplastic film 410 prior to being attached to the thermoplastic sheet 114.

In a typical embodiment, the pre-stretched laminated oriented mesh fabric 514 will have a weight in a range of between 16 gsm to 28 gsm. Such a layer of non-woven polyethylene mesh fabric 514 has a strong tensile strength in both machine and transverse directions. In one embodiment, it has been found to improve stability and tensile strength by a factor of four. It makes the entire LVT flooring system much more reliable and more stable and it adds additional strength to the entire hybrid underlayment construction to meet demands of LVT of many different thicknesses and strengths.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A hybrid underlayment, comprising:
   (a) a metalized thermoplastic film having a top side and an opposite bottom side;
   (b) a pre-stretched laminated oriented mesh fabric fused to at least a portion of the bottom side of the metalized thermoplastic film;
   (c) a thermoplastic sheet having a top surface and an opposite bottom surface, the metalized thermoplastic film and the pre-stretched laminated oriented mesh fabric disposed on and coupled to the top surface of the thermoplastic sheet; and
   (d) a plurality of expanded microspheres dispersed through the thermoplastic sheet.

2. The hybrid underlayment of claim 1, wherein the thermoplastic sheet makes up between 92.0% by volume to 95.5% by volume of the hybrid underlayment.

3. The hybrid underlayment of claim 1, wherein the microspheres make up between 1.0% by volume to 7.5% by volume of the hybrid underlayment prior to expansion of the microspheres.

4. The hybrid underlayment of claim 1, wherein the pre-stretched laminated oriented mesh fabric has a weight in a range of 16 gsm to 28 gsm.

5. The hybrid underlayment of claim 1, wherein the metalized thermoplastic film comprises polyethylene terephthalate.

6. The hybrid underlayment of claim 1, wherein the metalized thermoplastic film has a thickness in a range of 15 microns to 200 microns.

7. The hybrid underlayment of claim 6, wherein the metalized thermoplastic film has a thickness of 50 microns.

8. The hybrid underlayment of claim 1, wherein the metalized thermoplastic film is glued to the thermoplastic sheet with a heat activated glue.

9. A flooring for covering a floor substrate, comprising:
   (a) a hybrid underlayment that disposed on the floor substrate, the hybrid underlayment including:
      (i) a metalized thermoplastic film having a top side and an opposite bottom side;
      (ii) a pre-stretched laminated oriented mesh fabric fused to at least a portion of the bottom side of the metalized thermoplastic film;
      (iii) a thermoplastic sheet having a top surface and an opposite bottom surface, the metalized thermoplastic film and the pre-stretched laminated oriented mesh fabric disposed on and coupled to the top surface of the thermoplastic sheet; and
      (iv) a plurality of expanded microspheres dispersed through the thermoplastic sheet; and
   (b) a plurality of interfacing LVT flooring units, each of which is disposed on the hybrid underlayment.

10. The flooring of claim 9, wherein the metalized thermoplastic film comprises polyethylene terephthalate.

11. The flooring of claim 9, wherein the metalized thermoplastic film has a thickness in a range of 15 microns to 200 microns.

12. The flooring of claim 11, wherein the metalized thermoplastic film has a thickness of 50 microns.

13. The flooring of claim 9, wherein the metalized thermoplastic is glued to the thermoplastic sheet.

14. The flooring of claim 9, wherein the pre-stretched laminated oriented mesh fabric has a weight in a range of 16 gsm to 28 gsm.

15. A floor, comprising:
   (a) a sub-floor;
   (b) a hybrid underlayment that disposed on the floor substrate, the hybrid underlayment including:
      (i) a metalized thermoplastic film having a top side and an opposite bottom side;
      (ii) a pre-stretched laminated oriented mesh fabric fused to at least a portion of the bottom side of the metalized thermoplastic film;
      (iii) a thermoplastic sheet having a top surface and an opposite bottom surface, the metalized thermoplastic film and the pre-stretched laminated oriented mesh fabric disposed on and coupled to the top surface of the thermoplastic sheet; and
      (iv) a plurality of expanded microspheres dispersed through the thermoplastic sheet; and
   (c) a plurality of interfacing LVT flooring units, each of which is disposed on the hybrid underlayment.

16. The floor of claim 15, wherein the metalized thermoplastic film comprises polyethylene terephthalate.

17. The floor of claim 15, wherein the metalized thermoplastic film has a thickness in a range of 15 microns to 200 microns.

18. The floor of claim 17, wherein the metalized thermoplastic film has a thickness of 50 microns.

19. The floor of claim 15, wherein the pre-stretched laminated oriented mesh fabric has a weight in a range of 16 gsm to 28 gsm.

* * * * *